United States Patent [19]

Satomi

[11] 4,320,963

[45] Mar. 23, 1982

[54] ORIGINAL FEEDING SYSTEM

[75] Inventor: Toyokazu Satomi, Yokohama, Japan

[73] Assignee: Ricoh Co., Ltd., Japan

[21] Appl. No.: 103,234

[22] Filed: Dec. 13, 1979

[30] Foreign Application Priority Data

Dec. 19, 1978 [JP] Japan ................................ 53-155811

[51] Int. Cl.[3] ...................... G03B 27/46; G03B 27/62; B65H 5/12

[52] U.S. Cl. .................................. 355/50; 188/77 R; 271/3; 271/272; 271/277; 355/75

[58] Field of Search ..................... 271/277, 3, 82, 247, 271/272, 270, 275; 355/3 SH, 14 SH, 50, 51, 75, 76, 104; 188/77 R, 85, 163

[56] References Cited

U.S. PATENT DOCUMENTS

| | | | |
|---|---|---|---|
| 1,778,570 | 10/1930 | Soresi | 188/85 |
| 2,392,068 | 1/1946 | Sexton | 188/163 |
| 3,196,767 | 7/1965 | Eichorn | 271/277 X |
| 3,258,530 | 6/1966 | Fowlie et al. | 271/3 X |
| 3,614,090 | 10/1971 | Del Vecchio et al. | 271/277 |
| 4,072,306 | 2/1978 | Idstein | 271/277 X |

*Primary Examiner*—Bruce H. Stoner, Jr.
*Attorney, Agent, or Firm*—McGlew and Tuttle

[57] ABSTRACT

An original feeding system having a rotary drum provided with sheet original hold-down claws for clamping the leading edge of the sheet original against the surface of the periphery of the rotary drum and with a control mechanism for keeping the claws in clamping engagement with the sheet and releasing the claws from clamping engaging therewith. A belt drive is provided for feeding the copy sheet by holding same between the rotary drum and the belt. The rotary drum is adapted to be stopped in its rotation before it completes one revolution, while the belt drive continues to be driven to feed the sheet original, which is subjected to the frictional force exerted by the belt and slides along the surface of the rotary drum. Therefore, it is possible to feed a sheet original having a length larger than the circumferential length of the rotary drum.

1 Claim, 9 Drawing Figures

ORIGINAL FEEDING SYSTEM

FIELD AND BACKGROUND OF THE INVENTION

This invention relates to a system for feeding an original to be duplicated.

One type of original feeding system comprising a rotary drum rotably mounted for attaching an original in sheet form to its periphery, means for driving the rotary drum, and clamping means including claws for clamping the leading edge of the original in sheet form to the periphery of the rotary drum is known, from Japanese Patent Publication No. Sho-41-4426. In this original feeding system, an original in sheet form is attached to the rotary drum during rotation of the latter, and occurrence of mistakes in clamping the original to the rotary drum is inevitable. Other disadvantages of this system are that it is only during rotation of the drum that an original can be fed and that limitations are placed on the length of the original that can be handled by the circumferential length of the rotary drum.

Proposals have been made to provide means for feeding an original to the rotary drum so that the movement of the original is temporarily stopped and the original is clamped to the drum by feeding it at a rate higher than the peripheral velocity of the drum, as in Japanese Patent Publication No. Sho-49-48138. The original feeding system incorporating therein the means described hereinabove has the disadvantage that difficulties are encountered in accurately feeding a sheet original when feeding rates are changed in producing duplicates by varying the duplication mode from one copy size to another, in addition to the disadvantages of the first-mentioned system.

Meanwhile, it is also proposed, as in Japanese Patent Application No. Sho-52-124035, to provide the original feeding system with rotary drum control means for stopping the rotary drum so that the original clamping claws are located in the original feeding position, and means for preventing the original from being released from the original clamping claws when copying is carried out in a repeat copying mode. The original feeding system provided with these means is capable of feeding originals of an endless web type or of a large length. However, when the system handles a sheet original of a large length, there arises the problem that since the sheet original of the large length is fed to the rotary drum while the latter is temporarily rendered stationary, irregularities may occur in feeding originals by temporarily stopping the rotation of the drum and the copies produced may bear the brunt of such irregularities.

SUMMARY OF THE INVENTION

This invention obviates the aforesaid disadvantages of the prior art. Accordingly, the invention has as its object the provision of an original feeding system capable of feeding a sheet original of a large length by using a rotary drum of a small diameter without irregularities in feeding.

According to the invention, the aforesaid object is accomplished by providing the original feeding system with drive means performing the function of feeding an original by holding same between it and a rotary drum, and means for temporarily stopping the rotation of the rotary drum until an unexposed portion of the sheet original passes through an exposing region, before the rotary drum returns to its original position following completion of one revolution.

Additional and other object, features and advantages of the invention will become apparent from the description set forth hereinafter when considered in conjunction with the accompanying drawings.

DESCRIPTION OF THE PREFERRED EMBODIMENT

Figure 1:
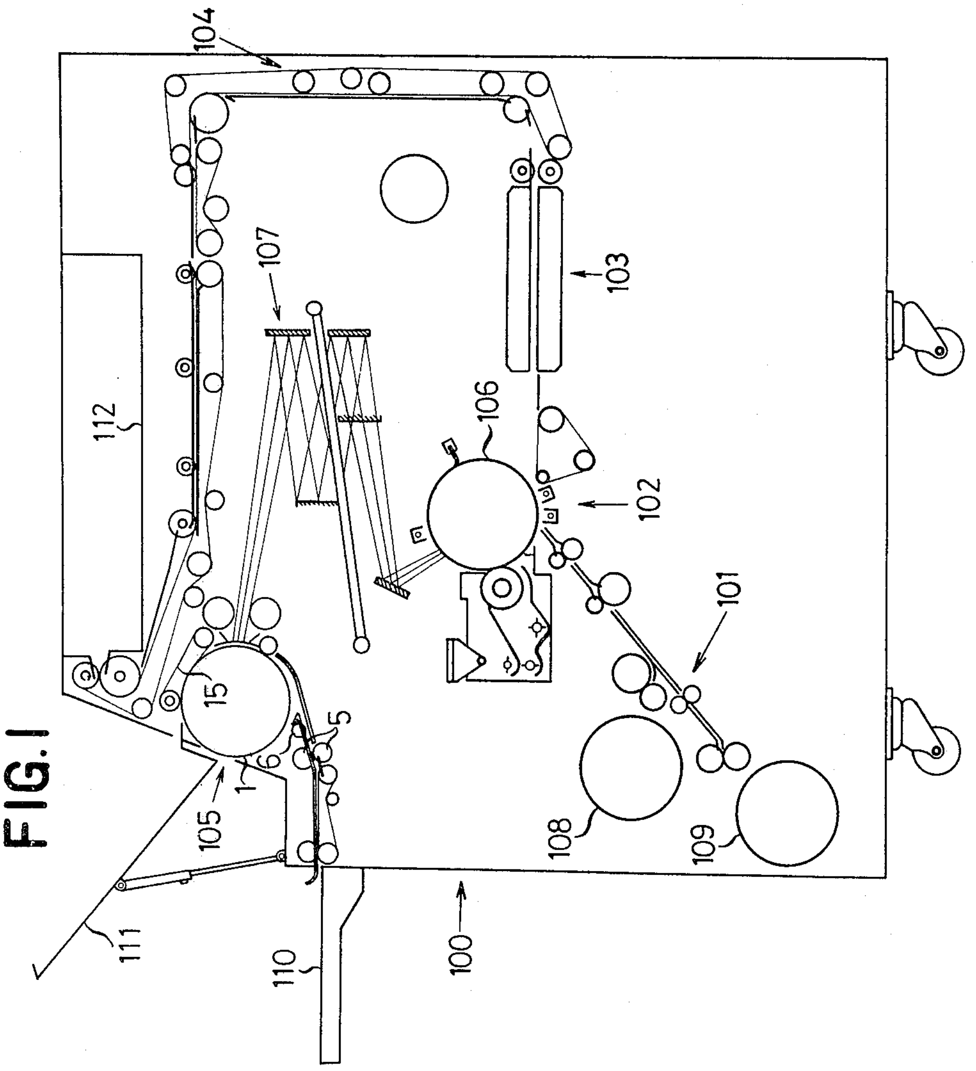
FIG. 1 is a schematic view of an electrophotographic copying apparatus provided with an original feeding system according to the invention.

A preferred embodiment of the invention will now be described by with reference to the drawings. In FIG. 1, an electrophotographic copying apparatus 100 includes a copy sheet feeding section 101, an image forming and transfer-printing section 102, an image fixing section 103, a completed copy ejecting section 104 and an original feeding system 105. The image forming and transfer-printing section 102 includes charging, exposing, developing, transfer-printing and cleaning devices of the known type located around a photosensitive drum 106. Their detailed description will be omitted. There is provided an image projecting optical system 107 part of which is movable to effect copying by changing the magnification of an original. The copy sheet feeding section 101 has two types of rolls of paper web 108 and 109 one of which is selectively fed to the photosensitive drum 106. The apparatus 100 also includes an original inserting tray 110, an original receiving tray 111 and a completed copy receiving tray 112. The present invention is concerned with the original feeding system 105 which will be described in detail hereinafter.

Figure 2:
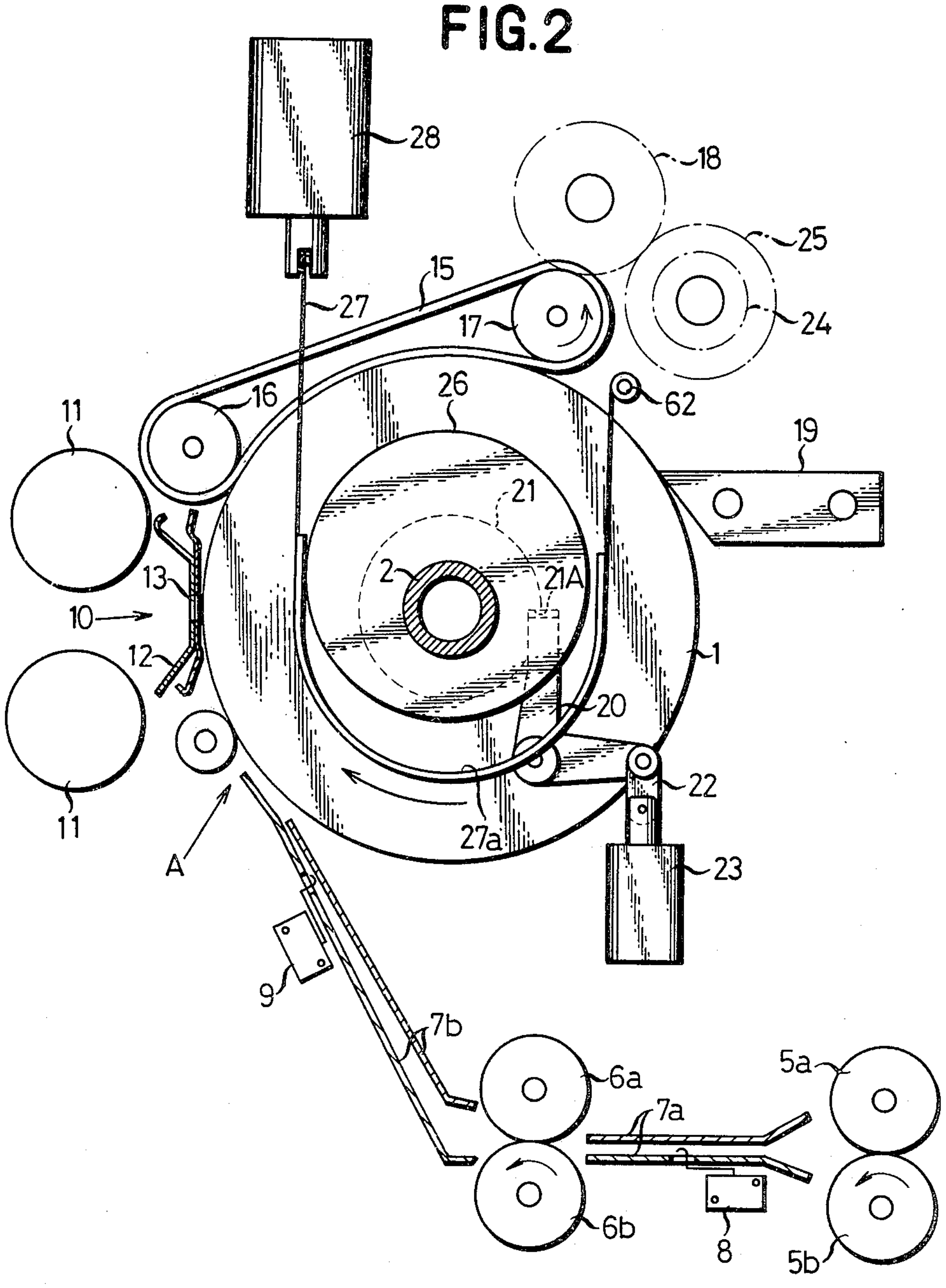
FIG. 2 is an end view, partly in section, of the rotary drum.
Figure 3:
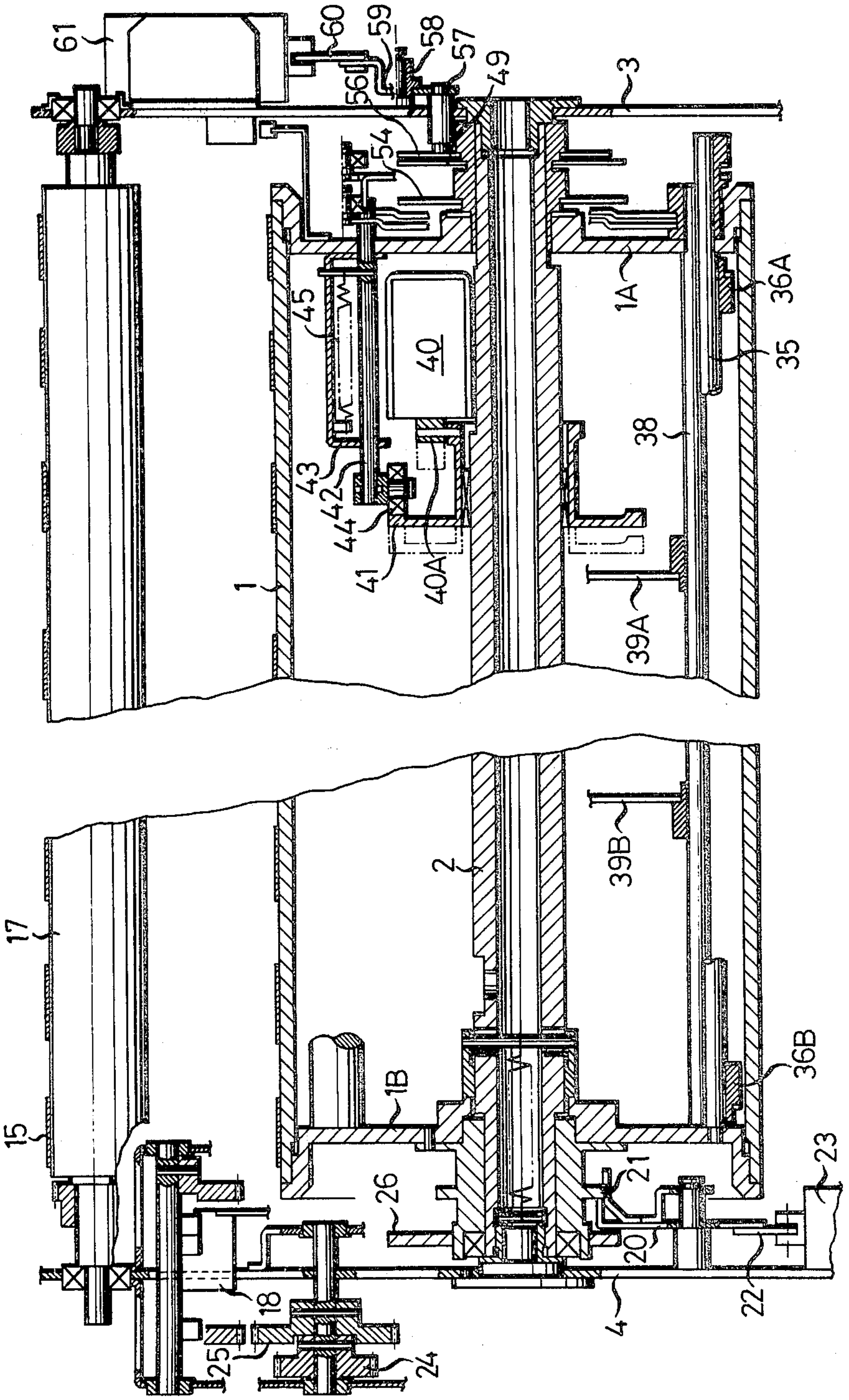
FIG. 3 is a vertical sectional view of the rotary drum.

A rotary drum 1 shown in FIG. 2 is rotatably supported through two flanges 1A and 1B by a drum shaft 2 secured to two side plates 3 and 4 as shown in FIG. 3. Located below the rotary drum 1 is original feeding means comprising pairs of original feeding rollers *5a* and *5b* and *6a* and guide plates *7a* and *7b*. The upper and lower guide plates *7a* and *7b* define original passages. The original passage defined by the guide plates *7a* has mounted therein a sheet original detecting switch 8 and the original passage defined by the guide plates *7b* has mounted therein a sheet original detecting switch 9, the two switches 8 and 9 being spaced from each other by a predetermined distance. The detecting switches 8 and 9 perform the function of detecting the presence or absence of sheet originals moving through the original passages defined by the guide plates 7*a* and 7*b* and the length of any sheet original that may move therethrough, to control the rotation of the rotary drum 1 and the operation of other parts of the machine. The symbol A designates a position at which the leading end of a sheet original is clamped.

Figure 4:
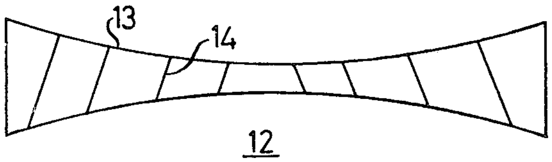
FIG. 4 is a plan view of the exposing slit section.
Figure 5:
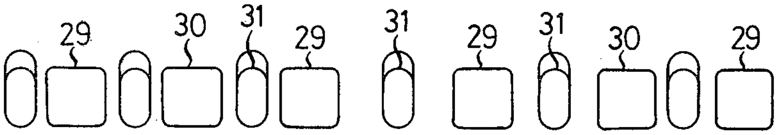
FIG. 5 is a plan view of the clamping position on the periphery of the rotary drum.

An exposing slit section 10 has a light source 11 connected thereto for emitting light which is projected through a slit 13 (See FIG. 4) formed in a plate member 12. The slit 13 is shaped such that the central portion of each major length side is narrowed as shown in FIG. 4, to thereby effect correction of the distribution of the volume of light. Fine threads 14 of nylon or tungsten wire are divergingly mounted between the two major length sides of the slit 13 in such a manner that the distance between the surface of the rotary drum 1 and the threads 14 is about 1 mm, to thereby avoid upward movement of the sheet original. The sheet original is clamped at its leading edge as aforesaid but its trailing edge is free. The curling or otherwise irregularly disposed sheet original is held down by the threads 14.

A plurality of belts 15, part of which are in contact with the rotary drum 1, are trained over a pair of rollers 16 and 17 located posterior to the exposing slit section 10 with respect to the direction of rotation of the rotary drum 1. The roller 17 is a drive roller for driving the rotary drum 1 for rotation by frictional dragging. The belts 15 are advantageously formed of material, such as urethane rubber, that has resilience and a high coefficient of friction. The drive roller 17 is driven from a drive, not shown, through a drive gear 24, a gear 25 and an electromagnetic clutch 18. The follower roller 16 which is supported for free rotation includes a belt winding portion high in the center to prevent the belts 15 from moving toward one another. The roller 16 has a slidable bearing portion so that it is possible to adjust the pressure at which the belts contact the rotary drum 1.

A pick-off plate 19 is located in the vicinity of a sheet original releasing position posterior to the belts 15 with respect to the direction of rotation of the rotary drum 1. The pick-off plate 19 has its forward end disposed near the surface of the periphery of the rotary drum 1 and performing the function of separating the leading edge of the sheet original from the surface of the rotary drum 1 and guiding same in its movement after the sheet original is released from clamping engagement with clamping claws of the rotary drum and pushed out therefrom.

Pivotally connected to the left side plate 4 shown in FIG. 3 is a rotary drum start lever 20 having one end engageable with a locking portion 21A of a stop sleeve 21 connected to the shaft 2 of the rotary drum 1 and the other end connected to a solenoid 23 through a link 22 (See also FIG. 2). When the solenoid 23 is energized and pulls the link 22, the rotary drum start lever 20 moves clockwise in pivotal movement and is released from engagement with the engaging portion 21A, and at the same time the electromagnetic clutch 18 is energized to drive the drive roller 17. Rotation of the drive roller 17 is transmitted through the belts 15 to the rotary drum 1 to rotate same. If the solenoid 23 is de-energized after rotation of the rotary drum 1 has started, then the drum start lever 20 is returned to its engaging position and brought into engagement with the stop sleeve 21 that has made one complete revolution, thereby stopping rotation of the rotary drum 1 after it has made one complete revolution. When the operation is in a repeat copying mode, the solenoid 23 is energized again before the rotary drum 1 stops rotating or the solenoid 23 is continuously energized.

An eccentric disk 26 is attached to the flange 1B of the rotary drum 1 and rotates therewith. A brake belt 27 is formed of a thin sheet of metal, such as stainless steel, and has attached to its inner side which contacts the eccentric disk 26 a lining member **27*a* formed of material of a high coefficient of friction, such as rubber, felt, leather, etc. The brake belt 27 is secured at one end thereof to a brake solenoid 28 and at the other end thereof to a stud 62 secured to the left side plate 4. When the brake solenoid 28 is energized, the brake belt 27 is pulled upwardly and the lining member 27*a* is brought into contact with the eccentric disk 26 as the latter rotates and its radius is increased. The frictional dragging of the eccentric disk 26 on the lining member 27*a* of the brake belt 27 gradually increases and overcomes the rotational force of the rotary drum 1, so that the rotary drum 1** stops rotating.

The rotary drum 1 has a planar surface formed in one portion of its peripheral surface, having square and elliptical openings 29, 30 and 31 formed therein. Original clamping claws 32 for clamping the leading edge of the sheet original, original stoppers 33 for correctly positioning the leading edge of the sheet original and a push-out plate 34 for stripping the sheet original off the surface of the rotary drum 1 are arranged in a manner to move into and out of the openings 29, 30 and 31.

Figure 8:
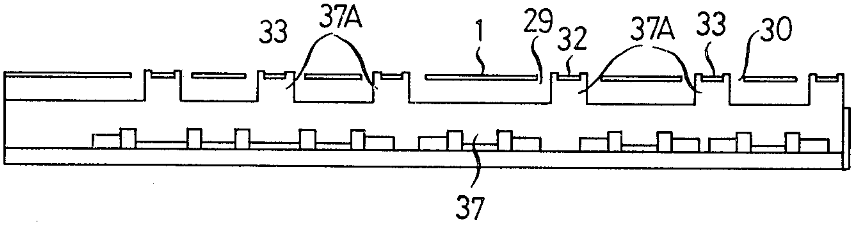
FIG. 8 is a plan view of the original hold-down bracket.
Figure 6:
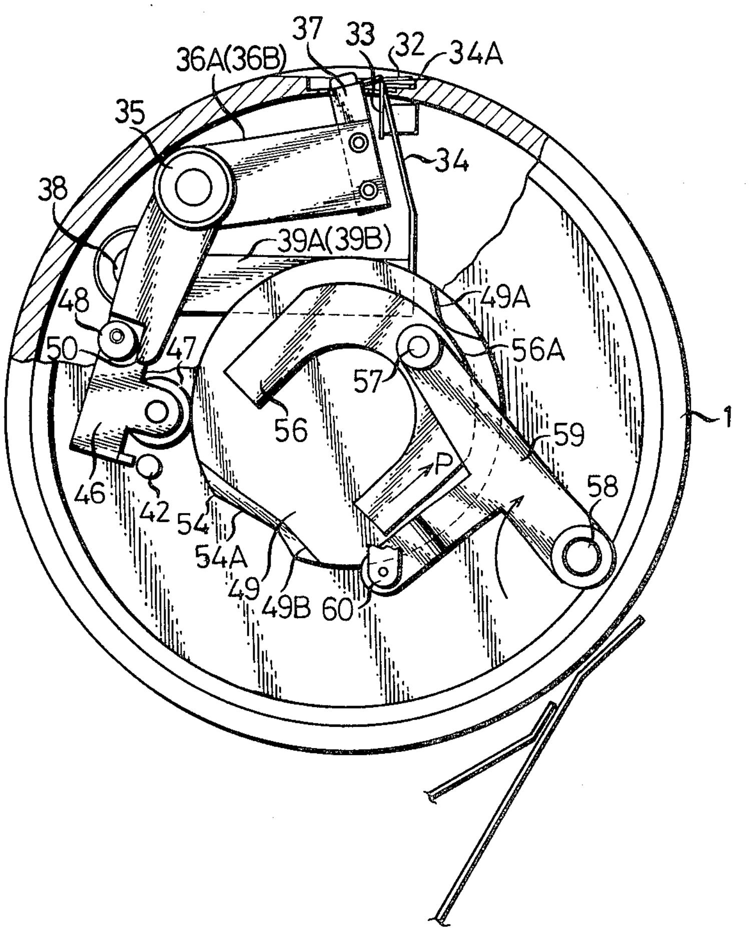
FIG. 6 is another end view of the rotary drum showing the original clamping claws and the push-out plate in a clamping position.
Figure 7:
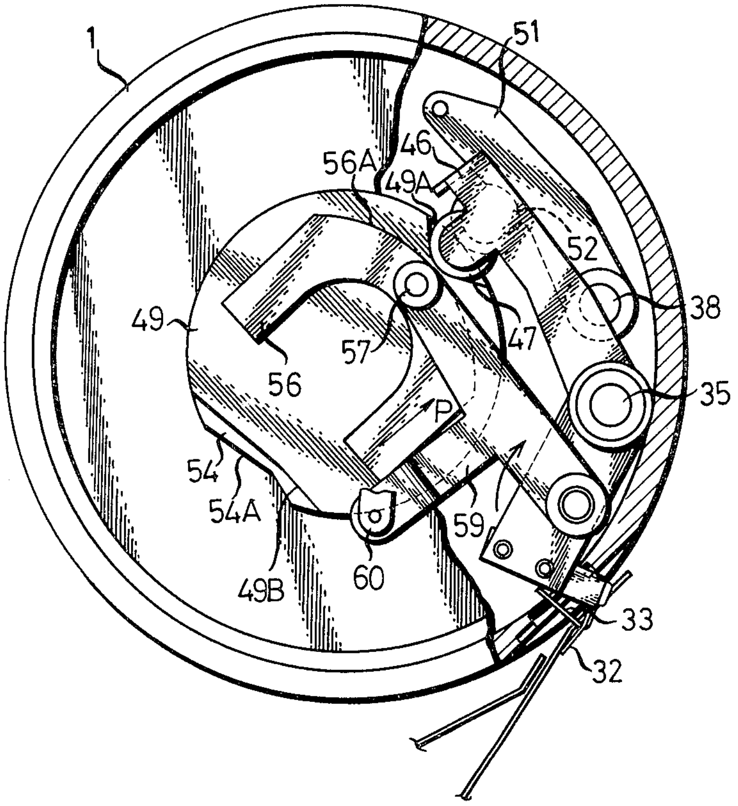
FIG. 7 is an end view of the rotary drum similar to FIG. 6 but showing the original clamping claws in a standby position.

In FIGS. 6 and 7, a sheet original hold-down shaft 35 is supported for rotation in openings formed in the right and left flanges 1A and 1B of the rotary drum 1, one portion of the sheet original hold-down shaft 35 extending outwardly through the right flange 1A (See FIG. 3). The hold-down shaft 35 has secured to portions thereof near the right and left flanges 1A and 1B sheet original hold-down bracket arms 36A and 36B which support a sheet original hold-down bracket 37 therebetween. The sheet original hold-down bracket arms 36A and 36B are urged by a spring, not shown, to move counter clockwise (FIG. 6). As shown in FIG. 8, the sheet original hold-down bracket 37 has elevated and depressed portions on its longitudinal end surface, and the elevated portions 37A have the sheet original hold-down claws 32 and original stoppers 33 secured thereto for movement through the openings 29 and 30 to extend outwardly of the peripheral surface of the rotary drum 1 and return to the original positions. A push-out shaft 38 is rotatably supported in openings formed in the right and left flanges 1A and 1B, a portion of the shaft 38 extending through the right flange 1A to outside. The push-out shaft 38 has secured to portions thereof near the right and left flanges 1A and 1B push-out arms 39A and 39B which support the push-out plate 34 therebetween. The push-out arms 39A and 39B are urged by a spring, not shown, to move counter clockwise about the shaft 38. The push-out plate 34 has at the forward end of a projection at its longitudinal end portion an L-shaped portion serving as a push-out member 34A which can freely extend into and out of a window 31 formed in the rotary drum 1. The L-shaped push-out member 34A is normally in contact with a depression on the peripheral surface of the rotary drum 1, but acts in a manner to push the leading edge of the sheet original in a direction in which it is separated from the surface of the rotary drum 1 when the sheet original is stripped off the surface of the rotary drum 1.

As shown in FIG. 3, the rotary drum 1 has mounted on the shaft 2 a solenoid 40 having a plunger 40A connected to a stop shaft sleeve 41 slidably mounted on the shaft 2. A stop shaft 42 is slidably supported by a bracket 43 and connected at one end thereof to the stop shaft sleeve 41 through a roller 44. The other end of the stop shaft 42 extends outwardly of the right flange 1A against the biasing force of a tension spring 45 acting thereon. Thus the sheet original hold-down shaft 35, push-out shaft 38 and stop shaft 42 project outwardly through the right side flange 1A. The sheet original hold-down shaft 35 and push-out shaft 38 each have two sets of levers attached thereto as presently to be described. As shown in FIG. 6, a first original lever 46 is rotatably fitted over the sheet original hold-down shaft 35 and has a forward end disposed in a position in which it is engageable with the stop shaft 42. Disposed slightly away from the forward end of the lever 46 on its inner surface is a roller 47 which is supported for rotation, and adjusting cam 48 is connected to the lever 46. An original cam 49 is secured to the drum shaft 2 and formed with control depressions 49A and 49B disposed in diametrically opposed positions on its circumference. The roller 47 is adapted to engage the circumference of the original cam 49. The first original lever 46 is urged by the biasing force of a spring, not shown, to move counter clockwise about the original hold-down shaft 35 or in a direction in which the roller 47 is brought into contact with the circumference of the original cam 49.

A second original lever 50 is secured to the sheet original hold-down shaft 35 in a position disposed outwardly of the first original lever 46 and has a free end which is disposed is spaced juxtaposed relation to the adjusting cam 48 attached to the first original lever 46.

Figure 9:
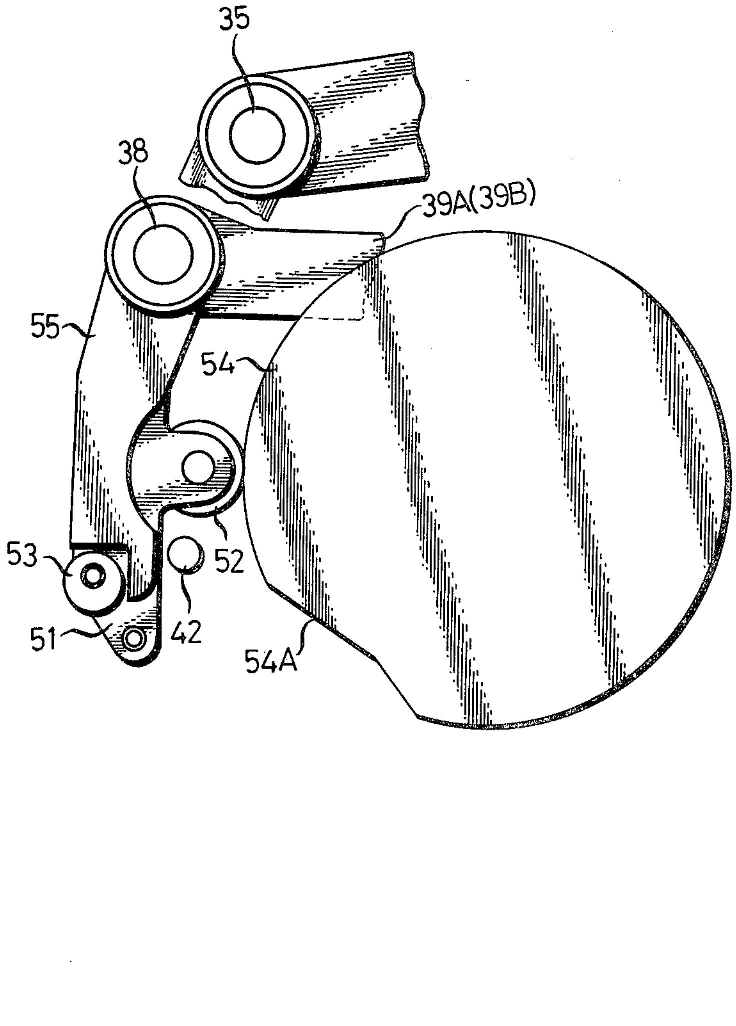
FIG. 9 is a view in explanation of the hold-down plate control means.

A first pushout lever 51 is rotatably fitted over the push-out shaft 38 as shown clearly in FIG. 9 and has a forward end disposed in a position in which it is engageable with the stop shaft 42. A roller 52 is supported in a position slightly away from the forward end on the inner surface of the push-out lever 51, and an adjusting cam 53 is secured to the lever 51. A push-out cam 54 is secured to the drum shaft 2 and has a control depression 54A formed on its circumference in a position corresponding to the control depression 49B of the original cam 49. The roller 52 is adapted to engage the circumference of the push-out cam 54. The first push-out lever 51 urged by the biasing force of a spring, not shown, to move counter clockwise about the push-out shaft 38 or in a direction in which the roller 52 is brought into contact with the push-out cam 54. A second push-out lever 55 is secured to the push-out shaft 38 in a position outwardly of the first push-out lever 51 and has a free end which is disposed in spaced juxtaposed relation to the adjusting cam 53 attached to the first push-out lever 51.

As described hereinabove, the original cam 49 and push-out cam 54 are secured to the portion of the drum shaft 2 disposed outwardly of the right flange 1A. The control depression 49A of the original cam 49 performs the function of opening the original hold-down claws 32 outwardly of the periphery of the rotary drum 1 to be ready for clamping down the sheet original (See FIG. 7), and the control depression 49B thereof performs the function of opening the original hold-down claws 32 to release the sheet original clamped down thereby. The control depression 54A of the push-out cam 54 is operative to actuate the push-out plate 34 to push the leading edge of the sheet original away from the surface of the rotary drum 1, to release the sheet original clamped down by the sheet original clamp claws 32.

When the rotary drum 1 rotates, the roller 47 of the first original lever 46 and the roller 52 of the first push-out lever 51 rotate along the circumferences of the original cam 49 and push-out cam 54 respectively. However, in major diameter portions of the circumference of each cam 49, 54, the first original lever 46 and first push-out lever 51 are spaced apart from the stop shaft 42 by a small clearance and out of engagement therewith.

The drum shaft 2 has mounted thereon for sliding movement in the direction of an arrow P in FIG. 6 or in the radial direction of the rotary drum 1 an original cam plate 56 which is disposed adjacent the original cam 49. The original cam plate 56 has an actuating portion 56A which is brought into contact with the roller 47 of the first original lever 46 when the original cam plate 56 is moved into an actuating position. The actuating portion 56A is of an arcuate shape having a diameter substantially equal to the major diameter of the original cam 49. The original cam plate 56 is normally disposed in a position shown in FIGS. 6 and 7. When disposed in this position, the actuating portion 56A of the original cam plate 56 is disposed at the bottom of the control depression 49A or further inwardly therefrom. From this position, the original cam plate 56 moves in sliding movement in the direction of the arrow P. The distance covered by the movement of the original cam plate 56 is such that the actuating portion 56A thereof is in alignment with the major diameter circumferential portion of the original cam 49.

A shaft 57 secured to the original cam plate 56 extends outwardly through the right side plate 3, as shown in FIG. 3. A grip solenoid lever 59 pivoted at 58 on the side plate 3 has one arm end pivotally connected to the shaft 57, and the other arm end connected to a solenoid 61 through a link 60. Upon energization of the solenoid 61, the grip solenoid lever 59 is moved through the link 60 clockwise in FIG. 6 in pivotal movement about the pivot 58 to thereby move the original cam plate 56 in sliding movement in the direction of the arrow P, until the actuating portion 56A is brought into alignment with the major diameter circumferential portion of the original cam 49.

The right and left side plates 3 and 4 are supported by a unit support shaft, not shown, for rotary movement relative to the main body of the apparatus, so that the original feeding system as a whole can be moved in swinging movement, thereby facilitating maintenance and inspection of the exposing unit and cleaning of the lamp.

The original feeding system of the aforesaid construction operates as presently to be described.

First of all, the operation of the system in a single copy producing mode will be described. Prior to insertion of a sheet original, the rotary drum 1 and belt drive roller 17 remain stationary and the original hold-down claws 32 are in an open position as the roller 47 is engaged in the control depression 49A of the original cam 49 as shown in FIG. 7. The original feeding rollers 5*a* and 5*b* and 6*a* and 6*b* are rotating.

Upon a sheet original being inserted, the leading edge of the sheet original abuts against the original stopper 33 of the rotary drum 1 which remains stationary and is correctly positioned. Insertion of the sheet original is detected by the sheet original detecting switch 9 (See FIG. 2) slightly before the sheet original abuts against the original stopper 33. The detecting switch 9 produced a signal with a predetermined time lag to cause the original feeding rollers 5*a*, 5*b* and 6*a*, 6*b* to stop rotating after the leading edge of the sheet original has abutted against the original stopper 33, and also to energize the solenoid 61. Energization of the solenoid 61 moves the original cam plate 56 in the direction of the arrow P through the grip solenoid lever 59, with a result that the roller 42 engaged in the control depression 49*a* of the original cam 49 is brought to the major diameter circumferential position of the original cam 49. This causes the original hold-down bracket system 35, 36A, 36B and 37 which has up to then been swung counter clockwise by the adjusting cam 48 through the original lever 50, to rotate clockwise to the original position, so that the original hold-down claws 32 are closed to clamp the leading edge of the sheet original. The solenoid 23 and electromagnetic clutch 18 are energized in timed relation to the devices for charging, copy sheet feeding, etc., to cause the rotary drum 1 and belts 15 to begin to rotate. At the same time, the original feeding rollers 5*a*, 5*b* and 6*a*, 6*b* start rotating again.

Rotation of the rotary drum 1 causes the roller 47 of the first original lever 46 to roll along the circumference of the original cam 49. De-energization of the solenoid 61 brings the original cam plate 56 to its original position shown in FIGS. 6 and 7. The solenoid 23 is also de-energized to bring the rotary drum start lever 20 back into engagement with the stop sleeve 21. The rotary drum 1 continues rotating, and as it rotates through 165° after its starting position, the roller 47 of the first original lever 46 begins to engage the control depression 49B of the original cam 49 and the first original lever 46 begins to rotate counter clockwise about the original hold-down shaft 35. Thus the clearance between the adjusting cam 48 of the first original lever 46 and the forward end of the second original lever 50 begins to become smaller until they are brought into abutting engagement with each other. Then the first original lever 46 moves the second original lever 50 further counter clockwise to bring the original hold-down claws 32 out of engagement with the surface of the rotary drum 1, thereby releasing the leading edge of the sheet original from clamping engagement with the claws 32. The sheet original thus released from clamping engagement with the claws 32 is held between the rotary drum 1 and belts 15, so that transportation of the sheet original is continued.

Meanwhile the roller 52 of the first push-out lever 51 begins to engage the control depression 54A of the push-out cam 54 as it advances through about 170° from its starting position and causes the first push-out lever 51 to begin to rotate counter clockwise about the push-out shaft 38. This brings the adjusting cam 53 into engagement with the forward end of the second push-out lever 55, to cause the second push-out lever 55 to rotate counter clockwise. Thus the sheet original released from clamping engagement with the original hold-down claws 32 is pushed out by the push-out plate 34, and the leading edge of the sheet original is released from the surface of the rotary drum 1. The sheet original released from the surface of the rotary drum 1 is completely separated from the surface of the rotary drum 1 by the pick-off plate 19 and moved toward the original receiving tray 111. The trailing portion of the sheet original is still being transported by the rotary drum 1 and belts 15.

Rotation of the rotary drum 1 continues, and the roller 47 of the first original lever 46 and the roller 52 of the first push-out lever 51 pass by the control depressions 49B and 54A respectively, until they reach the major diameter circumferential portions of the cams 49 and 54 respectively. This brings the original hold-down claws 32 and push-out plate 34 into contact with the surface of the rotary drum 1 again. The rotary drum 1 temporarily stops rotating before the original hold-down claws 32 are restored to the position A in which they clamp down the leading edge of the sheet original, and starts rotating again after the trailing edge of the sheet original has passed through the exposing slit section 10. The temporary interruption of rotation is effected by energizing the brake solenoid 28. Thus, when the sheet original that is being fed has a large length, feeding is carried out in one of the following two modes: In one mode the sheet original passing through the exposing slit section 10 is fed while the rotary drum 1 is rotating, and in the other mode the sheet original is fed by the belts 15 while the rotary drum 1 is stationary.

In order to ensure precision in production, aluminum or other metal is used for producing the rotary drum 1, and the drum 1 is journalled by bearings offering least resistance and has its balance adjusted to avoid irregular rotation. The rotary drum 1 has inertia which is greater than the inertia of the sheet original. Thus, when the rotary drum 1 temporarily stops rotating, irregularities will occur in the feeding of sheet originals if a commonly used method relying on the start lever 20 and engaging portion 21A is adopted. This will manifest itself as jitters on the produced copies.

To avoid this trouble, in the present invention, the brake solenoid 28 is energized during the time the rotary drum 1 moves from the original releasing position in which the pick-off plate 19 is located to the position A in which the leading edge of the sheet original is clamped to gradually increase the braking force between the brake belt 27 and the eccentric disk 26 until the rotary drum 1 is brought to a standstill. In this way, the inertia of the rotary drum 1 is slowly absorbed so that no irregularities occur in feeding the sheet original. The sheet originals which are generally formed of ordinary paper, tracing paper, polyester film, etc., may vary in their coefficient of friction depending on material and thickness and in the time elapsing before they become stationary after the brake is applied. However, the use of the eccentric disk 26 makes it possible to cope with these changes. The position in which the rotary drum 1 is temporarily rendered stationary is not critical. Besides the eccentric disk 26, a disk having a radius that gradually changes in involute or Archimedean spiral curve, for example, may be used to serve the desired purpose and attain the desired end.

The timing for de-energizing the brake solenoid 28 may be controlled by signals produced by the detecting switches 8 and 9 as the passing of the trailing edge of the sheet original is detected by the switches.

As the rotary drum 1 starts rotating again after being temporarily stopped and approaches the position A in which the leading edge of the sheet original is clamped, the roller 47 of the first original lever 46 engages the control depression 49A of the original cam 49 again, to bring the claws 32 to the position shown in FIG. 7 in which the claws 32 are opened and ready for clamping the next following sheet original. However, the roller 52 of the push-out lever 51 rolling along the circumference of the push-out cam 54 continues its rolling movement because the push-out cam 54 has no control depression corresponding to the control depression 49A of the original cam 49. Thus the push-out plate 34 remains in contact with the depression on the circumferential surface of the rotary drum 1.

Meanwhile the engaging portion 21A of the stop sleeve 21 located on the left side of the rotary drum 1 engages the drum start lever 20 which has already been brought to its engaging position, thereby interrupting rotation of the rotary drum 1. The belts 15 continue movement to deliver the sheet original held between them and the rotary drum 1, although the latter remains stationary. The sheet original is subjected to the frictional force exerted by the belts 15 and slides along the surface of the rotary drum 1. When the feeding of the sheet original is finished, the electromagnetic clutch 18 is de-energized by means of a detecting switch, a timer, etc., not shown, to render the belts 15 stationary. All the operations for the single copy producing mode have thus been completed.

In a repeat copying mode, a sheet original is inserted and clamped and rotation of the rotary drum 1 is initiated in the same manner as described with reference to a single copy producing mode. Setting of a copy counter at the desired number of copies generates a repeat signal which energizes the solenoid 40 before the roller 47 of the first original lever 46 and the roller 52 of the first push-out lever 51 engage the control depressions 49B of the original cam 49 and the control depression 54A of the push-out cam 54 respectively, so that the stop shaft 42 is caused through the stop shaft sleeve 41 to project into a position in which it engages the first original lever 46 and the first push-out lever 51. When in this state, the first original lever 46 and first push-out lever 51 slightly moves when they reach the control depressions 49B and 54A respectively. However, the first original lever 46 and first push-out lever 51 are caused by the stop shaft 42 to stop swinging before the adjusting cam 48 and 53 are brought into contact with the second original lever 50 and second push-out lever 55. Thus the sheet original hold-down claws 32 and push-out plate 34 are impervious to the influences exerted by the movement of the rollers through the control depressions, and the sheet original is not released from clamping engagement with the claws 32. After the rollers 47 and 52 have passed through the control depressions 49B and 54A, the rollers move along the major diameter circumferential surfaces of the respective cams to keep the sheet original in the clamped position, even if the solenoid 40 is de-energized. The rotary drum 1 continues rotating and temporarily stops before it reaches the position A as is the case with the single copy producing mode. After the trailing edge of the sheet original has passed through the exposing slit section 10, the rotary drum 1 starts rotating again. However, re-energization of the solenoid 40 prevents the roller 47 from engaging the control depression 49A, and re-energization of the solenoid 23 causes the rotary drum 1 to start its second revolution. The aforesaid operations are repeated for the number of times at which the copy counter is set. When the last copies are to be produced, the solenoids 40 and 23 are not energized and the operations are performed in the same manner as in the single copy producing mode. Thus the sheet original is released from clamping engagement with the claws 32.

During rotation of the rotary drum in the repeat copying mode, the solenoid 40 may be energized continuously instead of being energized in association with the movement of the rollers through the control recesses as described hereinabove.

From the foregoing description, it will be appreciated that the present invention enables a sheet original of a large length to be fed satisfactorily by means of a rotary drum of a small diameter. By using a rotary drum for the sheet original having a circumferential length slightly greater than the length of sheet originals that are most frequently used, it is possible to increase the copy speed for a repeat copying mode and it is thus possible to reduce the time required for effecting repeat copying.

What is claimed is:

1. An original feeding system comprising: a rotary drum;
   - an exposing region where a sheet original carried by the drum is exposed for projecting its image through an optical system to a photosensitive surface;
   - original feeding rollers for supplying the sheet original to the rotary drum;
   - sheet original hold-down claws mounted on the rotary drum for clamping the leading edge of the sheet original against the surface of the periphery of the rotary drum; and
   - sheet original hold-down claws control means for keeping the sheet original hold-down claws in clamping engagement with the leading edge of the sheet original during rotation of the rotary drum and releasing the sheet original hold-down claws from clamping engagement therewith in an original releasing position; wherein the improvement comprises:
   - drive means consisting essentially of a plurality of belts for frictionally driving the rotary drum and for feeding the sheet through the exposing region while holding the sheet between the belts and the rotary drum; and
   - means for temporarily stopping rotation of the rotary drum until passing of an unexposed portion of the sheet through the exposing region is finished, before the rotary drum returns to its original position following completion of one revolution, said rotary drum temporarily stopping means comprising a friction member for frictionally engaging the rotary drum and applying a frictional braking force gradually varying in accordance with the angle of rotation of the rotary drum; said rotary drum temporarily stopping means comprising a brake belt controllable by a brake solenoid and an eccentric cam disc secured to the rotary drum, with the brake belt engaged at least partly around the cam disc so that rotation of the rotary drum and cam disc, with activation of said solenoid causes increasing frictional interaction between said brake belt and said cam disc.

* * * * *